E. Sterling,
Fish Hook.
No. 70,913. Patented Nov. 12, 1867.
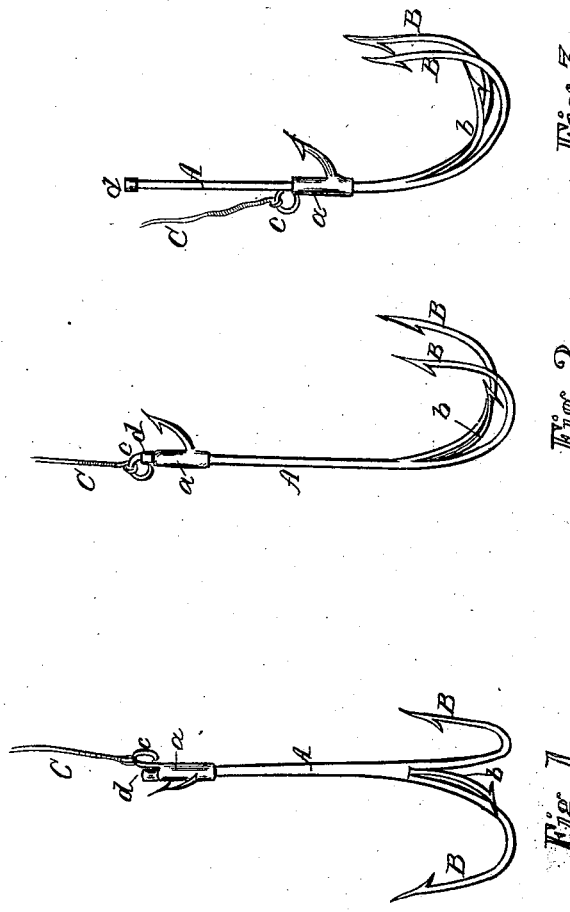
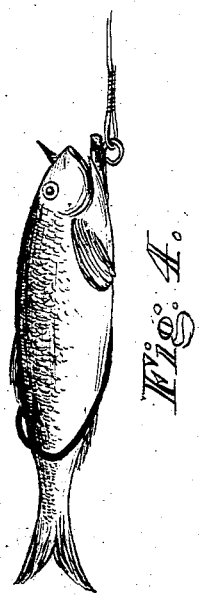
Witness
A. Marvin
Geo. W. Tibbits
Inventor
Elisha Sterling

United States Patent Office.

ELISHA STERLING, OF CLEVELAND, OHIO.

Letters Patent No. 70,913, dated November 12, 1867.

---

IMPROVEMENT IN FISH-HOOKS.

---

The Schedule referred to in these Letters Patent and making part of the same.

---

TO ALL WHOM IT MAY CONCERN:

Be it known that I, ELISHA STERLING, of Cleveland, county of Cuyahoga, in the State of Ohio, have invented a new and improved Fish-Hook; and I do hereby declare that the following is a full and exact description thereof, reference being had to the accompanying drawings, and to the letters of reference marked thereon.

Figure 1 is a front view.

Figure 2 is a side view.

Figure 3 is also a side view, showing the extension-hook lowered.

Figure 4, fish on hook.

A represents the shank of a double fish-hook, the points B B being spread apart so as to embrace but not to enter the bait or minnow. $a$ represents a sliding or extension-hook, which has a ring, $c$, to which the line C is attached. $b$ represents a counter extension-hook, for securing the bait or minnow between the hooks B B. $d$ is a head or stop on the end of the shank A, to limit the upward movement extension-hook $a$, and also prevent its becoming detached.

The nature of this improvement consists in providing the ordinary fish-hook (single or double) with a sliding extension-hook, $a$, and a counter extension-hook, $b$, whereby the bait or minnow may be well secured between the hooks B B, and along the entire length of the shank.

To enable others to fully understand my improvement, I will describe its construction and operation.

On the shank A of the fish-hook I place a sliding or extension-hook, $a$, upon which there is a ring, $c$, for attaching the line C. This hook is intended to be inserted into the head of a minnow or bait, and hold it firmly next to the shank A. Between the hooks B B, at their intersection, I also fix a counter extension-hook, $b$, which is bent forward in the direction of the hooks B B, and has a barb on the under side, the hooks B B being spread apart so that a minnow may lie between them; or, if it be a single hook, the minnow would lie upon one side, as the large hooks B B are not intended to be inserted into the bait, the small hook $b$ being intended for that purpose, and confines it well on the hook and along the entire length of the shank.

The practical application of this improvement is as follows: When the minnow is to be applied, the sliding extension-hook $a$ being lowered on the shank A, and inserted in the head of the minnow, the hook $b$ is also inserted in said minnow at or near the anus, and then, by drawing upon the extension-hook $a$, the counter extension-hook $b$ is forced downward into the minnow, thus holding it firmly in place between the hooks B B and along the shank A. By this means the bait is not liable to be pulled off or lost, which frequently occurs with the hooks now in common use.

Having thus described my improvement, what I claim as new, and desire to secure by Letters Patent, is—

The combination with the hook A B, the sliding extension-hook $a$, and the counter extension-hook $b$, constructed substantially in the manner and for the purpose set forth.

ELISHA STERLING.

Witnesses:
A. J. MARION,
GEORGE W. TIBBITTS.